US009489209B2

(12) United States Patent
Gillespie

(10) Patent No.: US 9,489,209 B2
(45) Date of Patent: Nov. 8, 2016

(54) BIOS GRAPHICAL SETUP ENGINE

(75) Inventor: Kurt D. Gillespie, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1814 days.

(21) Appl. No.: 12/747,828

(22) PCT Filed: Jan. 23, 2008

(86) PCT No.: PCT/US2008/051748
§ 371 (c)(1),
(2), (4) Date: Jun. 11, 2010

(87) PCT Pub. No.: WO2009/094021
PCT Pub. Date: Jul. 30, 2009

(65) Prior Publication Data
US 2010/0277487 A1    Nov. 4, 2010

(51) Int. Cl.
*G06F 13/14* (2006.01)
*G06F 9/44* (2006.01)
*G06F 3/14* (2006.01)
*G09G 5/00* (2006.01)
*G06T 1/20* (2006.01)
*G09G 5/06* (2006.01)
*G09G 5/36* (2006.01)

(52) U.S. Cl.
CPC .............. *G06F 9/4401* (2013.01); *G06F 3/14* (2013.01); *G06T 1/20* (2013.01); *G09G 5/001* (2013.01); *G09G 5/06* (2013.01); *G09G 5/363* (2013.01)

(58) Field of Classification Search
CPC ........ G06F 3/14; G09G 5/363; G09G 5/006; G09G 5/001; G06T 1/20
USPC ........................................................ 345/520
See application file for complete search history.

(56) References Cited

U.S. PATENT DOCUMENTS

| | | | | |
|---|---|---|---|---|
| 5,918,039 A | * | 6/1999 | Buswell et al. | ................ 703/27 |
| 6,078,306 A | * | 6/2000 | Lewis | ...................... G09G 5/34 345/685 |
| 6,651,188 B2 | * | 11/2003 | Harding et al. | ........... 714/38.13 |
| 6,718,464 B2 | * | 4/2004 | Cromer et al. | ................... 713/2 |

(Continued)

FOREIGN PATENT DOCUMENTS

JP      2006-338241     12/2006

OTHER PUBLICATIONS

International Search Report & Written Opinion dated Oct. 15, 2008, pp. 9

*Primary Examiner* — Abderrahim Merouan
(74) *Attorney, Agent, or Firm* — HP Inc Patent Department

(57) ABSTRACT

A system and method for rendering a graphical setup display. A computer system comprises a first non-volatile storage device and a second non-volatile storage device. The first non-volatile storage device comprises a Basic Input/Output System ("BIOS"). The BIOS further comprises a BIOS graphical setup engine. The second non-volatile storage device comprises a setup image file containing a non-critical graphical setup image. The BIOS graphical setup engine selectively renders a basic graphical setup display omitting the non-critical image by using a set of pre-defined parameters stored in the first non-volatile storage device in place of the non-critical image if the non-critical image is not available, and renders an enhanced graphical setup display comprising the non-critical image contained in the setup image file stored in the second non-volatile storage device if the non-critical image is available.

20 Claims, 4 Drawing Sheets

(56) References Cited

U.S. PATENT DOCUMENTS

| | | | |
|---|---|---|---|
| 7,143,276 B2* | 11/2006 | Garrett et al. | 713/2 |
| 7,234,054 B2* | 6/2007 | Rothman | G06F 9/44505 |
| | | | 713/2 |
| 7,269,750 B1* | 9/2007 | Garritsen | G06F 1/3203 |
| | | | 713/320 |
| 7,318,173 B1* | 1/2008 | Falik et al. | 714/36 |
| 8,209,680 B1* | 6/2012 | Le et al. | 717/174 |
| 2002/0120431 A1* | 8/2002 | Keane | 703/11 |
| 2003/0037202 A1* | 2/2003 | Kedem et al. | 711/100 |
| 2003/0097555 A1* | 5/2003 | Cheston et al. | 713/2 |
| 2004/0150645 A1* | 8/2004 | Burrell | 345/467 |
| 2004/0236934 A1* | 11/2004 | Zimmer | G06F 9/4411 |
| | | | 713/1 |
| 2005/0144432 A1* | 6/2005 | Wu | 713/1 |
| 2005/0160191 A1* | 7/2005 | Maciesowicz | 710/1 |
| 2005/0177710 A1* | 8/2005 | Rothman | G06F 9/44505 |
| | | | 713/2 |
| 2007/0130375 A1* | 6/2007 | Lee | 710/8 |
| 2007/0276981 A1* | 11/2007 | Atherton | G06F 13/4022 |
| | | | 710/307 |
| 2010/0271388 A1* | 10/2010 | Gillespie | G06F 9/4443 |
| | | | 345/592 |

* cited by examiner

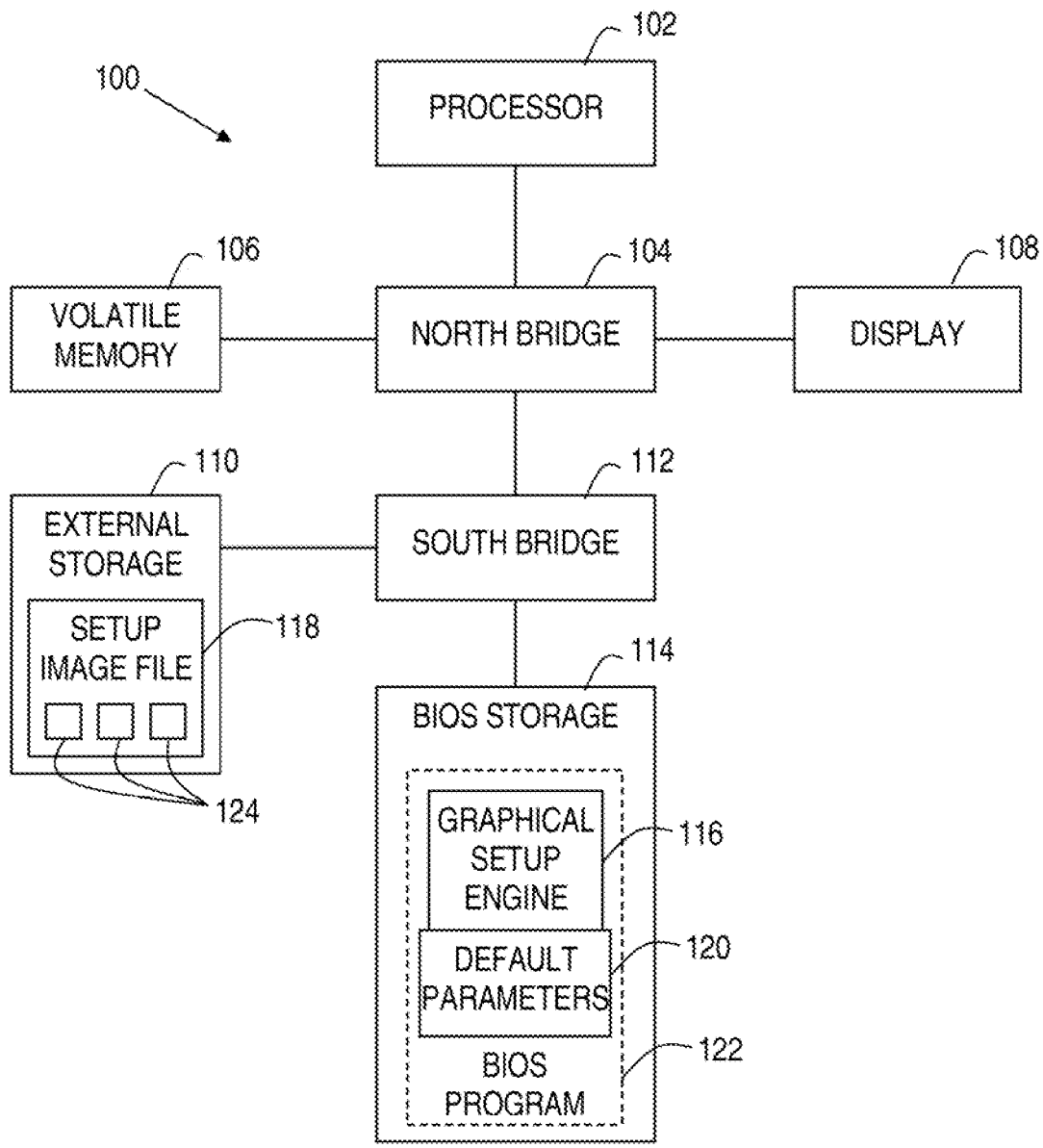

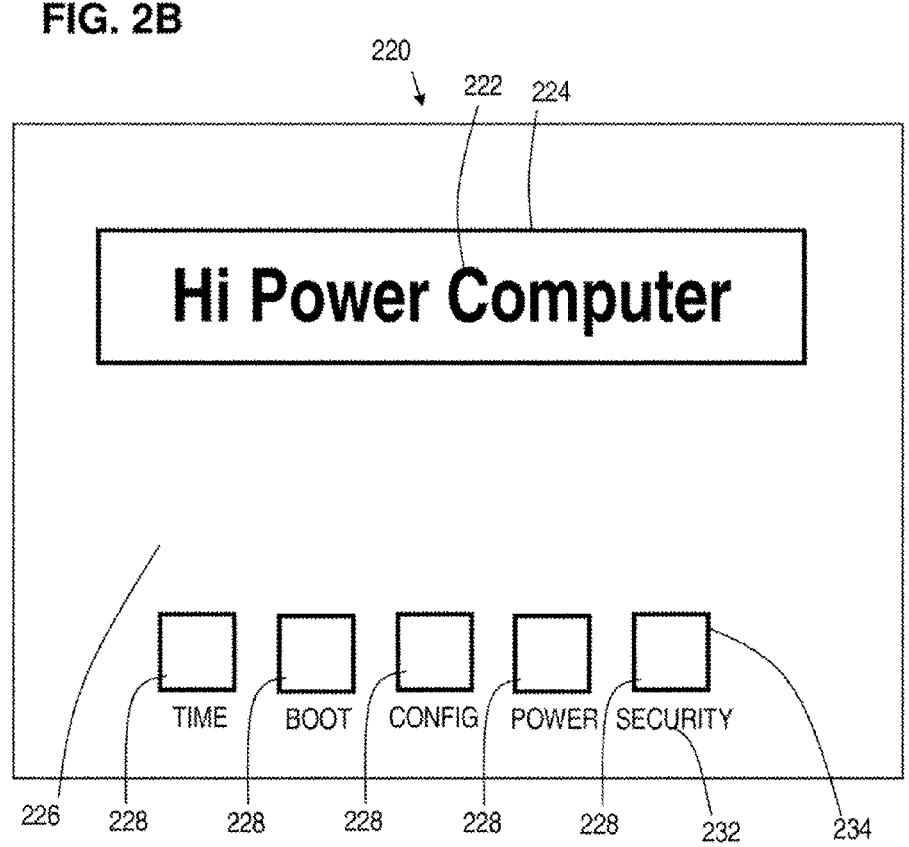

BIOS GRAPHICAL SETUP ENGINE

BACKGROUND

Computers typically comprise executable code referred to as the Basic Input/Output System ("BIOS") code. The BIOS code is executed to initialize (boot-up) the computer and transfer control to an operating system. Additionally, the BIOS tests the computer's hardware to ensure proper operation, locates specialized BIOS code residing on peripherals (e.g., graphics BIOS on a graphics board), and provides various interfaces to low-level functions of the computer such as access to storage drives, interaction with input devices, etc., for use by the operating system.

BIOS code is typically stored in a Read-Only-Memory ("ROM") or Flash memory device coupled to the computer's processor. The memory device may be addressable by the computer's processor at reset or the memory's contents may be transferred to RAM for execution. While such memory devices provide access to the BIOS program to boot-up the computer, they also restrict the amount of memory available for BIOS storage.

One or more settings are typically associated with a computer's BIOS. Examples of such settings include system date and time, drive configuration, security settings, power management settings, and memory timing. The computer user accesses BIOS settings through a "Setup" mode included in the BIOS. Depression of a selected keyboard key or key sequence (e.g., <F10> or <DELETE>) during system start-up triggers execution of the Setup mode. Typically, BIOS Setup mode interacts with the user through a simple textual interface devoid of the graphical displays and "point and click interaction" the user has come to expect when operating a modern computer. Graphical displays are memory intensive and the limited memory available for BIOS storage in conjunction with the cost of expanding BIOS memory has hindered the development of graphical displays for BIOS setup mode.

BRIEF DESCRIPTION OF THE DRAWINGS

For a detailed description of exemplary embodiments of the invention, reference will now be made to the accompanying drawings in which:

FIG. 1 shows a system employing a graphical setup engine that uses both externally stored non-critical images and defined image parameters in lieu of externally stored images to provide a graphical setup display in accordance with various embodiments;

FIGS. 2A and 2B show examples of graphical setup displays with and without non-critical images in accordance with various embodiments.

NOTATION AND NOMENCLATURE

Figure 2A:
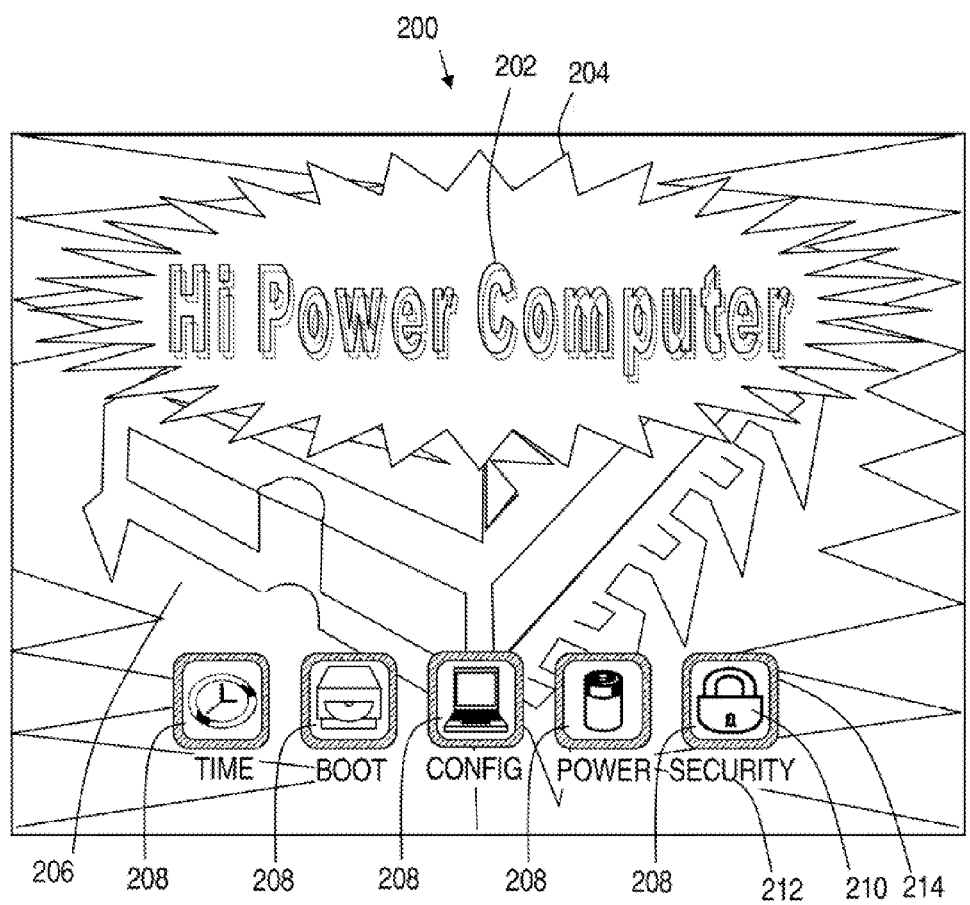

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more hardware and/or software components, and may be used to refer to an electronic device or devices, or a sub-system thereof. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows a system 100 employing a graphical setup engine 116 that uses externally stored non-critical images 124, as well as defined image parameters 120 in lieu of externally stored non-critical images 124 in accordance with various embodiments. The system 100 comprises a processor 102, a north bridge 104, and a south bridge 112. Various embodiments may implement north and south bridges 104, 112 as separate components or as a single component. The system 100 also comprises volatile memory 106, typically Dynamic Random Access Memory ("DRAM"); however, Static Random Access Memory ("SRAM"), or other suitable random access memory technology may also be used. Display 108 provides visual information to a user. A Liquid Crystal Display, Cathode Ray Tube display, plasma display, Organic Light Emitting Diode display, electro-luminescent display, projection display, or other display technology used to display text and graphics for a user may be employed.

Basic Input/Output System ("BIOS") storage 114 comprises a BIOS program 122 for booting the computer and transferring control to an operating system, e.g., Linux or Microsoft® Windows®. The term BIOS as used herein is intended to encompass a variety of boot, initialization, and operating system start-up programs known to those of skill in the art, including such programs based on the Unified Extensible Firmware Interface ("UEFI"). BIOS storage 114 comprises one or more memory devices in which the BIOS Program 122 is stored, and may be implemented as a Read Only Memory ("ROM") having its contents fixed at manufacture, a FLASH memory whose contents may be modified post-manufacture, or other type of non-volatile memory suitable for storing BIOS, for example, Programmable ROM ("PROM"), Electrically Erasable PROM ("EEPROM"), Magnetoresistive Random Access Memory ("MRAM"), or Ferroelectric memory. Some embodiments execute the BIOS program 122 directly from BIOS Storage 114. Other embodiments copy all or a portion of the BIOS program 122 from BIOS Storage 114 to Volatile Memory 106 for execution.

External Storage 110 provides storage for program and data elements apart from the BIOS Storage 114. External Storage 110 typically comprises a hard drive, but more generally may comprise a FLASH drive or any other non-volatile storage medium separate from the BIOS Storage 114. Thus, "External Storage" as used herein refers to a data storage device outside of BIOS Storage 114. External Storage 110 is accessible (e.g., write, read, etc.) to a user via operating system file accesses. In contrast, the BIOS Storage 114 writes are restricted to a specialized program to limit BIOS corruption opportunities. The capacity of External Storage device 110 is typically substantially greater than the capacity of BIOS Storage 114. For example, External Storage 110 will generally have a capacity measured at least in gigabytes, while BIOS Storage 114 may be restricted to a few megabytes. The interfaces (e.g., Advanced Technology Attachment, Small Computer Systems Interface, Universal Serial Bus, Fiber Channel, etc.) coupling External Storage device 110 to the remainder of system 100 are software controlled, rendering the device 110 inaccessible until system 100 software is running. On the other hand, in order to boot the system 100, the BIOS Storage 114 is accessible sans software support.

BIOS programs 122, such as that stored in BIOS Storage 114, typically comprise a BIOS setup program that allows the computer user to access and modify various operational settings of the system 100. In at least some embodiments, the setup program is initiated by depressing a key, for example <F10> or <DELETE>, prior to the operating system being loaded. The BIOS program 122 of system 100 comprises a Graphical Setup Engine 116 that comprises code and logic for providing a visually enhanced BIOS setup by incorporating graphics into the setup displays. Graphical elements may be relatively large in size, for example, an uncompressed background image may require several megabytes of storage. BIOS Storage 114 is of limited size, for example less than 2 megabytes, making it impractical to store large graphical elements therein.

Because BIOS Storage 114 is of limited size, embodiments of the system 100, store non-critical graphics elements 124, which are too large to store in BIOS Storage 114, in Setup Image File 118 of External Storage 110. Non-critical graphical setup images 124 comprise images that are not essential to the function of the setup program, that is, visual enhancements, such as background images and borders, without which the computer user can effectively interact with the setup program, but that make the setup display more visually appealing. Non-critical images 124 may also include character fonts to enhance the graphical setup displays. While the default parameters 120 may contain only a single font multiple character renderings of various sizes and styles (e.g., bold, italic) may be included in the Setup Image File 118. Thus, in some embodiments the non-critical setup images 124 are purely aesthetic in nature, while in other embodiments the non-critical setup images may be both aesthetic and informative. The setup program provides the same capabilities and functionalities irrespective of whether the non-critical images 124 are used. The Graphical Setup Engine 116 recognizes whether non-critical images 124 are available and builds the graphical displays accordingly, resulting only in changes to the appearance of setup displays when non-critical images 124 are unavailable.

Non-critical graphics elements 124 stored in the Setup Image File 118 may be either compressed or uncompressed. Embodiments of the Graphical Setup Engine 116 comprise image decompression logic for use with a variety of compression algorithms, for example, Joint Photographic Experts Group ("JPEG"), Graphics Interchange Format ("GIF"), or other compression algorithms.

FIGS. 2A and 2B show examples of differences in display embodiments generated by system 100 using non-critical images 124 to produce an enhanced display 200, and omitting non-critical images 124 to produce a basic display 220. The various graphical elements shown in FIGS. 2A and 2B are included only to illustrate differences between the two displays. Various embodiments may include different, more, or fewer graphical elements or functionalities.

FIG. 2A shows an example of a setup display 200 comprising non-critical images 124 retrieved from External Storage 110. The setup display is enhanced using the non-critical images 124, and comprises a background image 206, a starburst image 204 overlaying background 206 (an overlay image), company identification incorporating stylized text 202, buttons 208 including text 212, border 214, and identifying graphics 210. Each of the buttons 208 may be selected to initiate a further operation.

FIG. 2B shows an example of a basic setup display 220 generated if the various non-critical graphical elements used in FIG. 2A are unavailable. The basic graphical display generated without the non-critical images 124 comprises a solid color background 226 replacing background image 206, a rectangle 224 replacing starburst image 204, plain text 222 replacing stylized text 202, colored squares 228 replacing buttons 208 and graphics 210, and lines 234 replacing border 214. Text 232 replaces text 212 below each button. The operations initiated by selecting buttons 228 are the same as those initiated by buttons 208 in FIG. 2A. The basic display, thus, replaces the various missing non-critical graphical elements of enhanced display 200 with simpler elements while maintaining the same overall layout and functionality. The same information and functionality are presented to the user in both displays 200 and 220, only in a less appealing manner in basic display 220.

During system 100 start-up, the BIOS program 122 identifies External Storage 110. The BIOS program 122 further searches the External Storage 110, for example, examining any registered FAT32 (32 bit file access table) partitions, for an intact Setup Image File 118. Some embodiments store a Setup Image File 118 at a pre-selected path of a FAT32 partition known to the BIOS. Some embodiments support multiple instances of Setup Image File 118. Such embodiments may, for example, select either the first identified file 118 or the last written file 118 to supply the non-critical images 124 when multiple Setup Image Files are present.

If the Setup Image File 118 is located on External Storage 110, then the Graphical Setup Engine 116 reads the Setup Image File 118 into memory 106 and transforms the images 124 into the internal graphics format used by the Graphical Setup Engine 116. The Image File 118 is also checked for validity, for example, compatibility with the Graphical Setup Engine 116, proper formatting of the images (e.g., JPEG formatting), and correct file signature values, such as checksums or cyclic redundancy checks.

If the BIOS program 122 is unable to locate External Storage 110 or Setup Image File 118, or if Setup Image File 118 is invalid, Graphical Setup Engine 116 replaces the missing images with simple objects, for example, predefined solid color blocks and lines, as specified by default parameters 120 stored in BIOS Storage 114. The default parameters 120 comprise, for example, selected object colors, border line thicknesses and colors, and object transparencies. Use of simplistic objects, such as solid color blocks, in lieu of more complex objects, such as pictorial images, to produce a basic graphical setup display degrades the appearance of the setup displays generated by Graphical Setup Engine 116. However, the degradation results in neither loss of capacity to communicate system 100 settings, nor loss of functionality that the Graphic Setup Engine 116 provides to the user for configuration of system 100. Object movements, for example, an ornamental bouncing on-screen image, will also be displayed without regard to the availability of non-critical images 124. Thus, the Graphical Setup Engine 116 detects the availability of non-critical images 124 and adapts the appearance of setup displays correspondingly. While the appearance of the displays may differ based on availability of the non-critical images 124, the setup program provides the same functionalities and capabilities in either case.

Thus, without requiring an increase in expensive BIOS storage, embodiments provide a BIOS graphical setup display that is visually enhanced using non-critical images when a Setup Image File 118 is available. With no loss of functionality, embodiments provide a basic graphical setup display when the Setup Image File 118 is unavailable. Further, because Graphical Setup Engine 116 provides a basic graphical display when a Setup Image File 118 is unavailable, embodiments need not include a separate textual setup engine for use in lieu of the Graphical Setup Engine 118.

Figure 3:
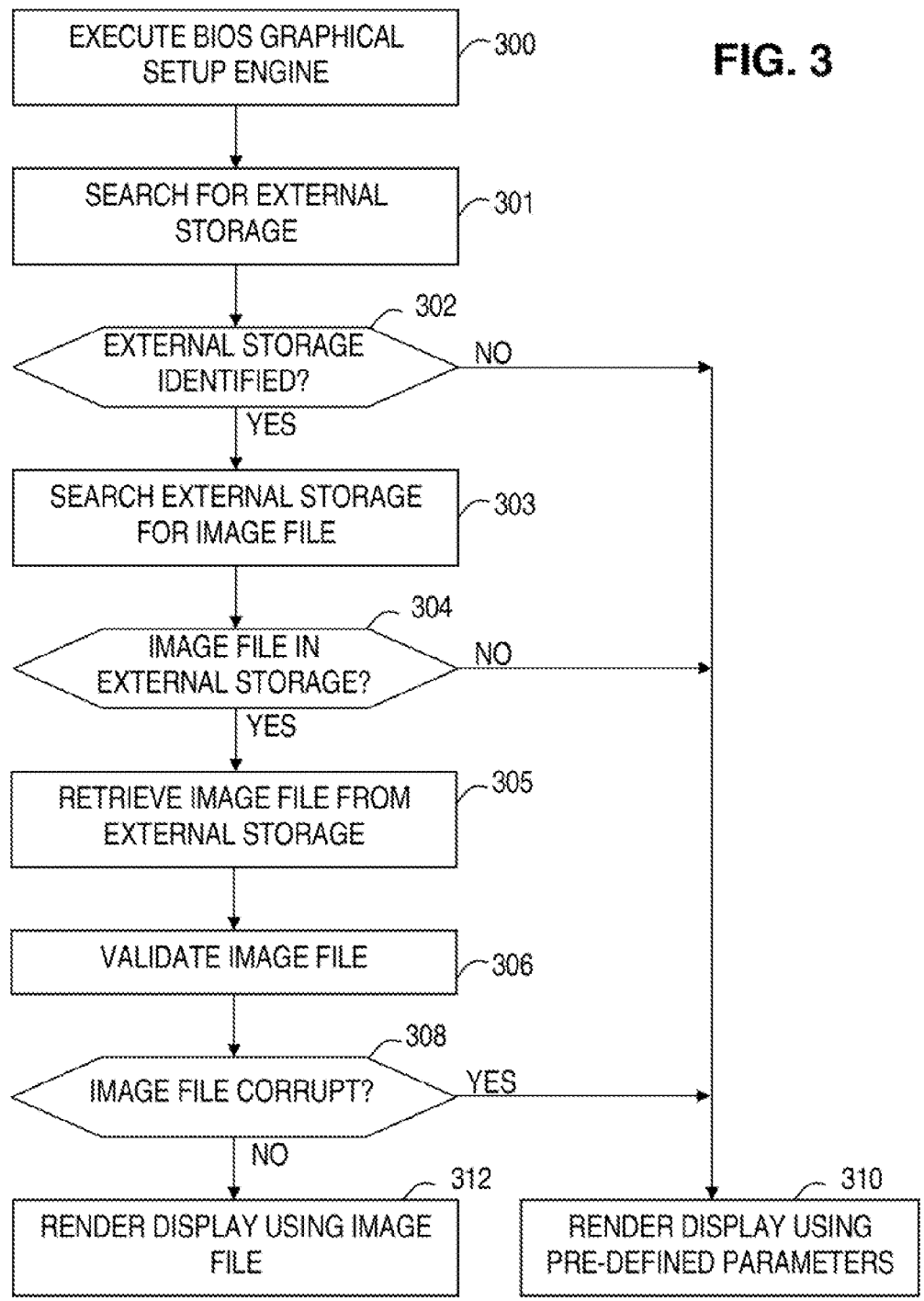
FIG. 3 shows a flow diagram for a method for using both externally stored non-critical images and pre-defined image parameters to provide a graphical setup display in accordance with various embodiments.

FIG. 3 shows a flow diagram for a method for using both externally stored non-critical images 124 and pre-defined image parameters 120 to provide a graphical setup display in accordance with various embodiments. Though depicted sequentially as a matter of convenience, at least some of the actions shown can be performed in a different order and/or performed in parallel. In block 300, a BIOS program 122 comprising a Graphical Setup Engine 116 begins execution. Typically, the system operator initiates the BIOS setup program by depressing a selected keyboard key, for example, <F10> or <DELETE>. The Graphical Setup Engine 116 comprises code and logic for providing a visually enhanced BIOS setup by incorporating graphics into the setup displays. The images applied to produce a visually appealing setup display are too large to be economically stored with the BIOS firmware. Therefore, non-critical graphics elements 124 are stored in less costly External Storage 110. If the non-critical graphics elements 124 are unavailable, the Graphical Setup Engine 116 provides a basic graphical setup display based on default parameters 120 stored with the BIOS firmware.

In block 301, the BIOS program 122 examines the system 100 in search of an External Storage device 110. If, in block 302, no External Storage device 110 is identified, for example, if the hard drive or other External Storage device 110 has been removed from the system 100, then the Graphical Setup Engine 116 renders a basic graphical setup display using simple objects constructed using pre-defined parameters 120 in block 310. Parameters 120 allow the user to access the setup program through graphical displays even if all external storage devices, such as External Storage 110, are removed from the system 100 or erased. The basic graphical setup display maintains the same layout as the enhanced graphical setup display but substitutes simple objects, such as blocks and lines, for the pictorial images and borders of the enhanced display. Thus, the user is presented with an operationally consistent interface across both displays.

If an External Storage device 110 is identified in block 302, then, in block 303, the BIOS program 122 searches the External Storage device 110 for a Setup Image File 118. In some embodiments the Setup Image File is expected to be at a pre-selected path of a known partition of External Storage device 110. In other embodiments the BIOS Program 122 may search the various partitions of External Storage device 110 for an Image File 118 having a predetermined file name or extension. If the External Storage device 110 contains multiple instances of the image file 118, then some embodiments may use the first image file 118 found. Other embodiments may use the instance of the image file 118 last written to the partition.

If, in block 304, no Setup Image File 118 is found on the External Storage device 110, then the Graphical Setup Engine 116 renders a basic graphical setup display using simple objects constructed using pre-defined parameters in block 310. If a Setup Image File 118 is found on External Storage device 110, then, in block 305, the Setup Image File 118 is retrieved from the External Storage device 110 into memory 106.

In block 306, the Image File 118 is validated to ensure that the file is properly formatted, not corrupt, and otherwise compatible with the Graphical Setup Engine 116. If, in block 308, the Setup Image File 118 is found to be invalid, then the Setup Image File 118 is not used, and Graphical Setup Engine 116 renders a basic graphical setup display using simple objects constructed using pre-defined parameters in block 310. Some embodiments may search External Storage 110 for an alternative Setup Image File 118 to use in lieu of the corrupt file.

If, in block 308, the Setup Image File 118 is found to be valid, then, in block 312, the Graphical Setup Engine 116 renders images using the Setup Image File 118 to produce an enhanced graphical setup display on display device 108.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a first non-volatile storage device, the first non-volatile storage device comprising a Basic Input/Output System ("BIOS"), the BIOS further comprising a BIOS graphical setup engine;
   a second non-volatile storage device, the second non-volatile storage device comprising a setup image file containing a non-critical graphical setup image; and
   wherein the BIOS graphical setup engine selectively renders a basic graphical setup display omitting the non-critical image by using a set of pre-defined parameters stored in the first non-volatile storage device in place of the non-critical image if the non-critical image is not available, and renders an enhanced graphical setup display comprising the non-critical image contained in the setup image file stored in the second non-volatile storage device if the non-critical image is available.

2. The computer system of claim 1, wherein the graphical setup engine renders the basic graphical setup display if the MOS fails to locate the second non-volatile storage device.

3. The computer system of claim 1, wherein the graphical setup engine renders the basic graphical setup display if the BIOS fails to locate the setup image file on the second non-volatile storage device.

4. The computer system of claim 1, wherein the graphical setup engine renders the basic graphical setup display if the setup image file of the second non-volatile storage device is invalid.

5. The computer system of claim 1, wherein the graphical setup engine searches the second non-volatile storage device to determine whether a setup image file is stored therein.

6. The computer system of claim 1, wherein the second non-volatile storage device is selected from a group consisting of a hard disk drive and FLASH memory.

7. The computer system of claim 1, wherein the BIOS is based on the Unified Extensible Firmware Interface ("UEFI").

8. The computer system of claim 1, wherein the set of pre-defined parameters for rendering the basic graphical setup display comprise at least one of the parameters selected from a group consisting of an object shape, an object size, a background color, a border thickness, a border color, and an object transparency.

9. The computer system of claim 1, wherein the graphical setup image comprises at least one image selected from a group consisting of a logo, an overlay image, a background image and a border image.

10. The computer system of claim 1, wherein the graphical setup engine generates the same display layout and object movement for the basic graphical setup display and the enhanced graphical setup display.

11. The computer system of claim 1, wherein the BIOS does not comprise a textual setup engine.

12. A method, comprising:
executing a BIOS graphical setup engine stored as firmware;
searching for an external storage device:
searching for a setup image file on the external storage device if an external storage device is found, the setup image file containing a non-critical image for use in a BIOS graphical setup display;
rendering the image contained in the setup image file to generate a BIOS graphical setup display if a valid setup image file is found on the external storage device.

13. The method of claim 12, further comprising generating a BIOS graphical setup display based on a set of predefined parameters if the external storage device is not found.

14. The method of claim 12, further comprising installing an image file comprising images for generating a BIOS graphical setup display on the external storage device, the image file is installed using an operating system to access the external storage device.

15. The method of claim 12, further comprising generating a graphical setup display based on a set of pre-defined parameters if the setup image file is not found on the external storage device.

16. The method of claim 12, further comprising generating a graphical setup display based on a set of pre-defined parameters if an invalid setup image file is found on the external storage device.

17. The method of claim 12, further comprising defining a set of parameters for generating a graphical setup display if the setup image file is unavailable, the graphical setup engine applies the parameters to replace elements of the graphic setup display otherwise supplied by the setup image file.

18. A non-transitory computer readable medium encoded with instructions that when executed cause a processor to:
generate, by a BIOS graphical setup engine, a Basic Input/Output System ("BIOS") graphical setup display from a setup image file; and
generate, by the BIOS graphical setup engine, the BIOS graphical setup display from a set of default parameters if the setup image file is unavailable.

19. The computer-readable medium of claim 18 encoded with instructions that when executed cause a processor to access a non-volatilely stored BIOS graphical setup engine, wherein the BIOS graphical setup engine program is stored in a different device than the setup image file.

20. The computer-readable medium of claim 18 encoded with instructions that when executed cause a processor to:
via BIOS execution:
detect the setup image file storage device,
detect the setup image file, and
validate the setup image file to ascertain setup image file availability.

* * * * *

UNITED STATES PATENT AND TRADEMARK OFFICE
CERTIFICATE OF CORRECTION

PATENT NO. : 9,489,209 B2  
APPLICATION NO. : 12/747828  
DATED : November 8, 2016  
INVENTOR(S) : Kurt D. Gillespie Page 1 of 1

It is certified that error appears in the above-identified patent and that said Letters Patent is hereby corrected as shown below:

In the Claims

In Column 6, Line 67 approx., in Claim 2, delete "MOS" and insert -- BIOS --, therefor.

In Column 7, Line 14 approx., in Claim 6, delete "and FLASH" and insert -- and a FLASH --, therefor.

In Column 7, Line 37 approx., in Claim 12, delete "device:" and insert -- device; --, therefor.

Signed and Sealed this  
Thirty-first Day of January, 2017

Michelle K. Lee  
*Director of the United States Patent and Trademark Office*